United States Patent
Soffer

(10) Patent No.: US 9,158,496 B2
(45) Date of Patent: Oct. 13, 2015

(54) SECURE AUDIO PERIPHERAL DEVICE

(75) Inventor: Aviv Soffer, Caesarea (IL)

(73) Assignee: HIGH SEC LABS LTD., Yokneam Industrial Zone (IL)

( * ) Notice: Subject to any disclaimer, the term of this patent is extended or adjusted under 35 U.S.C. 154(b) by 339 days.

(21) Appl. No.: 13/398,074

(22) Filed: Feb. 16, 2012

(65) Prior Publication Data

US 2013/0219525 A1 Aug. 22, 2013

(51) Int. Cl.
*H01R 3/00* (2006.01)
*G06F 3/16* (2006.01)
*G06F 21/83* (2013.01)

(52) U.S. Cl.
CPC ............... *G06F 3/162* (2013.01); *G06F 21/83* (2013.01)

(58) Field of Classification Search
CPC . H04R 29/008; H04R 1/222; H04M 2250/02; H04M 1/72527; H04M 1/2535; H04M 15/56; F21V 33/0056; G09F 3/0292; G09F 2003/0277
USPC ......................................................... 381/122
See application file for complete search history.

(56) References Cited

U.S. PATENT DOCUMENTS

| | | | | |
|---|---|---|---|---|
| 2,567,484 | A * | 9/1951 | Ivens | 379/171 |
| 3,372,236 | A * | 3/1968 | Schwartz | 379/376.01 |
| 3,715,514 | A * | 2/1973 | Bell, Jr. | 379/442 |
| 3,730,995 | A * | 5/1973 | Mathews | 381/110 |
| 3,965,465 | A * | 6/1976 | Alexander | 340/527 |
| 3,992,584 | A * | 11/1976 | Dugan | 381/82 |
| 4,081,614 | A * | 3/1978 | Dahlquist et al. | 379/49 |
| 4,171,471 | A * | 10/1979 | Boyles | 200/38 D |
| 4,279,254 | A * | 7/1981 | Boschetti et al. | 607/94 |
| 4,305,101 | A * | 12/1981 | Yarbrough et al. | 360/69 |
| 4,675,901 | A * | 6/1987 | Smith et al. | 379/406.04 |
| 4,837,819 | A * | 6/1989 | McClain | 379/424 |
| 4,872,095 | A * | 10/1989 | Dubak et al. | 362/100 |
| 4,942,605 | A | 7/1990 | McClain | |
| 5,018,057 | A * | 5/1991 | Biggs et al. | 362/295 |
| 5,818,948 | A * | 10/1998 | Gulick | 381/77 |
| 5,835,585 | A * | 11/1998 | Morse | 379/424 |
| 5,907,279 | A * | 5/1999 | Bruins et al. | 340/506 |
| 5,914,877 | A * | 6/1999 | Gulick | 700/94 |
| 6,226,609 | B1 * | 5/2001 | Imade | 704/235 |
| 6,587,951 | B1 * | 7/2003 | Flanigan | 713/310 |
| 6,636,273 | B1 * | 10/2003 | Weber | 348/734 |

(Continued)

OTHER PUBLICATIONS

Gigaware 33-124 USB Desktop Microphone date unknown printed Jan. 17, 2014.*

(Continued)

*Primary Examiner* — Paul R Myers
(74) *Attorney, Agent, or Firm* — Browdy and Neimark, PLLC

(57) ABSTRACT

A secure audio peripheral device, coupled to a computer, capable of enabling a user to use audio devices such as a microphone, speakers or headset when the device is in operational state, while giving to the user a clear visual indication that the audio devices are enabled. The device simultaneously disables the microphone; and turns off the visual indication when the device is in secure state. The operational state is activated by the user by pressing a momentary push-button switch. A timer resets the device to a secure state after a short preset time. The device has anti-tempering functionality and becomes permanently disabled if tempered with. Optionally the device is coupled to the computer via a USB port that powers a USB CODEC chip and a LED used as the visual indicator.

22 Claims, 8 Drawing Sheets

(56) References Cited

U.S. PATENT DOCUMENTS

| | | | |
|---|---|---|---|
| 6,670,008 B1* | 12/2003 | Ognissanti et al. | 428/40.1 |
| 6,704,063 B1* | 3/2004 | Van Der Wulp | 348/734 |
| 6,754,373 B1* | 6/2004 | de Cuetos et al. | 382/118 |
| 6,798,341 B1* | 9/2004 | Eckel et al. | 340/521 |
| 6,841,947 B2* | 1/2005 | Berg-johansen | 315/169.3 |
| 6,888,502 B2* | 5/2005 | Beigel et al. | 343/700 MS |
| 6,935,797 B2* | 8/2005 | Sim | 400/472 |
| 6,941,161 B1* | 9/2005 | Bobisuthi et al. | 455/569.1 |
| 7,142,666 B1* | 11/2006 | Bates et al. | 379/421 |
| 7,454,629 B2* | 11/2008 | Timmermans et al. | 713/194 |
| 7,920,499 B2* | 4/2011 | Isomaki et al. | 370/312 |
| 8,213,343 B2* | 7/2012 | Perraud et al. | 370/278 |
| 8,382,309 B1* | 2/2013 | Johnston | 362/156 |
| 8,494,181 B2* | 7/2013 | Nakao | 381/94.5 |
| 2003/0013491 A1* | 1/2003 | Moriki | 455/564 |
| 2004/0249477 A1* | 12/2004 | Blanpain | 700/17 |
| 2005/0047120 A1* | 3/2005 | Sargent | 362/156 |
| 2009/0017879 A1* | 1/2009 | Tsfaty et al. | 455/574 |
| 2009/0233735 A1* | 9/2009 | Savarese et al. | 473/407 |
| 2010/0171743 A1* | 7/2010 | Hata | 345/440 |
| 2011/0275323 A1* | 11/2011 | Goldman et al. | 455/41.2 |
| 2012/0229248 A1* | 9/2012 | Parshionikar et al. | 340/3.1 |
| 2013/0013841 A1* | 1/2013 | Jensen | 710/313 |

OTHER PUBLICATIONS

Sales offer for the Gigaware 33-124 USB Desktop Microphone copyright 2006.*

Auto Shut-down in wireless Headsets for Turtle Beach X32.*

Amazon.com Customer Reviews for Turtle Beach X32 wireless Headset including review dated Jan. 28, 2012.*

\* cited by examiner

Figure 2 (ART)

Figure 3 (ART)

SECURE AUDIO PERIPHERAL DEVICE

FIELD OF THE INVENTION

The present invention relates to a device and a method that enables a computer user to securely use audio communication devices such as desktop microphone and headset without being exposed to the risk of remote eavesdropping.

BACKGROUND OF THE INVENTION

The presence of microphones in computerized products such as desktop computers, laptop computers, PDAs, tablets and mobile phones creates an information security and privacy protection challenge today. As computers connected to public networks and to the internet can be easily hacked and controlled remotely, these products having internal or external microphones are at risk of becoming an eavesdropping bug. Attacker can install a malicious code on the product that will activate the microphone in such way that it will pick up surrounding conversation, compress the audio data and stream it over the internet to the interested attacker. Then the attacker reconstructs the audio signal, enhance it if needed and analyze it to recover valuable information. Such method can operate while the user is completely unaware and it can even run undetectable by anti-virus and intrusion detection programs through the use of Zero Day Vulnerabilities. Zero Day Vulnerabilities are non-publicized new security vulnerabilities that can be used by attackers to modify or control product functionality.

One of the most common methods used to hack computer microphone remotely is through the use of RAT. RAT is an acronym for Remote Access Trojan. A RAT might have a functional use, but it is typically used to describe malicious code that is installed without the user's knowledge with the intent of monitoring the computer, logging keystrokes, capturing passwords and otherwise assuming control of the computer from a remote location. Common RATs such as Sub7 have the functionality of enabling computer microphone or video camera remotely and streaming the data back to the attacker.

Prior-art computer microphones and headsets are prone to covert eavesdropping as they are typically not equipped with efficient means of disabling microphone activity when not used by the user. Even when On-Off switch is installed between the microphone and the audio CODEC circuitry, such switch is not efficient as users tend to leave it on continuously.

Computer microphones and headset devices are also lacking the clear user indications when microphone is active and therefore users are unaware when microphone is activated by software means.

Another disadvantage of prior-art computer microphones and headsets is the lack of anti-tampering means that will prevent physical attack on the device in attempt to bypass switches or other internal security means.

To overcome these disadvantages, many high-security organizations are instructing their workforce to remove all microphones and headsets from their desktop computers. In addition to that, many organizations are physically removing microphones from the laptop computers that they are purchasing and using.

U.S. Pat. No. 4,942,605 titled "Security Handset"; discloses a security handset. This handset is designed to prevent eavesdropping of telephone handsets while handset is on-hook. This prior-art device is not suitable for use in today's environment as computer headsets do not have on-hook/off-hook states. Headsets and microphones are not stored or hanged while not in active use.

SUMMARY OF THE EMBODIMENTS

In view of the security risks associated with microphones and headsets connected to computers, and in view of the shortcoming of prior art microphones and headsets connected to computers, there is a need for a secure computer microphone/headset device that as least will:
1. Provide efficient and secure switching of the microphone activity, controllable only by the user and completely isolated from computer control;
2. Prevent inadvertent long periods of active microphone by user neglect or lack of discipline; and
3. Provide clear user visual indications when microphone is active.

The present invention provides a device that enables a computer user to securely use audio communications without being exposed to the risk of remote eavesdropping.

More particularly, the invention discloses a method and apparatus to enable secure use of computer audio peripheral devices such as desktop microphone and headset. The secure audio device embodiments of the current invention isolate the activation—deactivation inputs from the connected computer in such way that prevent hacked computer from enabling its microphone or headset while the user is unaware.

It is an aspect of the current invention to provide a secure computer audio peripheral device comprising: a microphone; at least one lighted indicator capable of providing visual user indication when said microphone is active; a computer interface, cable connecting the secure computer audio peripheral device to a coupled computer; and; a switch, controllable by the user, and capable of setting said device in a secured state by simultaneously: disabling said microphone; and turning off said lighted indicator; and said switch is capable of setting said device in a operational state by simultaneously: enabling transfer of audio data from said microphone to said coupled computer; and turning on said lighted indicator.

In some embodiments the coupled computer comprises a USB port; said computer interface cable is USB type cable connected to said USB port; said device is further comprising of a USB CODEC to interface between said switch and said coupled computer; and wherein power to said device is supplied from said coupled computer through said USB port.

In some embodiments the switch is further coupled to the said USB CODEC mute input, to mute said microphone input when said device is in a secured state.

In some embodiments the illumination intensity of said lighted indicator is controlled by the user within a range of illumination levels.

In some embodiments the illumination intensity of said lighted indicator is automatically controlled by the ambient light sensor within a range of illumination levels.

In some embodiments disabling said microphone comprises electrically disconnecting said microphone from said computer interface cable.

In some embodiments the switch is activated by a momentary push-button operable as push-to-talk switch activated by the user to set said device in said operational state while said push-button is pressed, and automatically sets said device in said secured state when said push-button is released.

In some embodiments the switch wherein said switch is activated by the user through a momentary push-button, and wherein said switch is controlled by a time delay, activated by the user to set said device in said operational state, and automatically sets said device in said secured state after predefined time duration to prevent inadvertent prolonged microphone activation.

In some embodiments the time delay is adjustable by the user.

In some embodiments the device is further comprising a timer preventing inadvertent prolonged microphone activation when said momentary push-button is inadvertently or advertently stayed pressed for prolonged time duration.

In some embodiments the push-button comprises an internal lighted element providing user indication when microphone is active.

In some embodiments the switch is controlled by a VOX function, activated by the user to set said device in said operational state, and automatically sets said device in said secured state after predefined time duration in which sound level detected by said microphone is below a threshold.

In some embodiments the device is further comprising a mode selector, used by the user to select the operation mode of said device, wherein said device may operate in at least two of the modes selected from a group consisting of:
  a. PTT mode, wherein said switch is activated by a momentary push-button operable as push-to-talk switch activated by the user to set said device in said operational state while said push-button is pressed, and automatically sets said device in said secure state when said push-button is released;
  b. Timer mode, wherein said switch is controlled by a time delay, activated by the user to set said device in said operational state, and automatically sets said device in said secured state after predefined time duration to prevent inadvertent prolonged microphone activation; and
  c. VOX mode wherein said switch is controlled by a VOX function, activated by the user to set said device in said operational state, and automatically sets said device in said secured state after predefined time duration in which sound level detected by said microphone is below a threshold.

In some embodiments the device is further comprises an anti-tampering circuitry capable of detecting mechanical intrusion attempt, and to permanently disable said device once such attempt is detected.

In some embodiments the device is further comprises a power source for powering said active anti-tampering circuitry when the device is unpowered, wherein said power source is selected from a group consisting of: battery; and super-capacitor.

In some embodiments the is further comprising at least one audio output transducer selected from a group consisting of: a speaker; and an earphone, wherein said audio output transducer is active when said device is in said operational state and disabled when said device is in said secured state.

In some embodiments at least one audio output transducer is an earphone, and wherein said microphone and said earphone are integrated in a headset.

In some embodiments the headset is connected to said device via a connector.

In some embodiments the device is integrated into said headset.

In some embodiments the switch is located in a box located on a cable leading from said coupled computer to said headset.

It is another aspect of the invention to provide a method for securing a computer audio peripheral device comprising: a) coupling a to a computer, a secured computer audio peripheral device comprising: a microphone; and at least one visual indicator to provide visual user indication when said microphone is active; b) setting said device in a operational state by simultaneously: enabling transfer of audio data from said microphone to said coupled computer; and turning on said visual indicator; and c) setting said device in a secured state by simultaneously: disabling said microphone; and turning off said visual indicator.

In some embodiments the visual indicator is a lighted indicator; and said turning on said visual indicator comprises causing said visual indicator to emit visible light.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

Unless marked as background or art, any information disclosed herein may be viewed as being part of the current invention or its embodiments.

BRIEF DESCRIPTION OF THE OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DETAILED DESCRIPTION OF THE DRAWINGS

Figure 1:
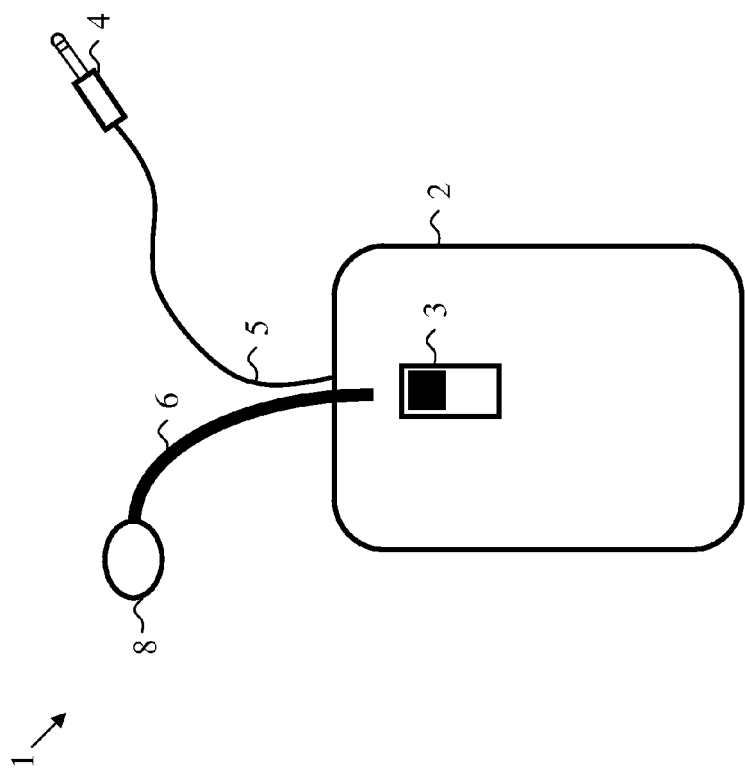
FIG. 1 illustrates a simplified drawing of a typical prior-art computer desktop microphone peripheral device having goose-neck boom, On-Off switch and interface cable.

Before explaining at least one embodiment of the invention in detail, it is to be understood that the invention is not necessarily limited in its application to the details set forth in the following description or exemplified by the examples. The invention is capable of other embodiments or of being practiced or carried out in various ways.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

In discussion of the various figures described herein below, like numbers refer to like parts. The drawings are generally not to scale. For clarity, non-essential elements may have been omitted from some of the drawing.

To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, or the like) or multiple pieces of hardware. Similarly, the programs may be stand alone programs, may be incorporated as sub-routines in an operating system, may be functions in an installed software package, and the like.

FIG. 1 illustrates an external diagram presenting of a prior art computer desktop microphone device 1 having a dynamic or electret microphone capsule 8 installed on a flexible goose neck boom 6 that couples to a desktop base 2. An On-Off switch 3 used to enable—disable the microphone activity. Cable 5 connects the microphone device through connector 4 to the coupled computer (not shown here and in the following figures).

This prior-art computer desktop microphone is lacking efficient microphone switching, user indications and tampering detection means and therefore it is regarded as non-secure device.

Figure 2:
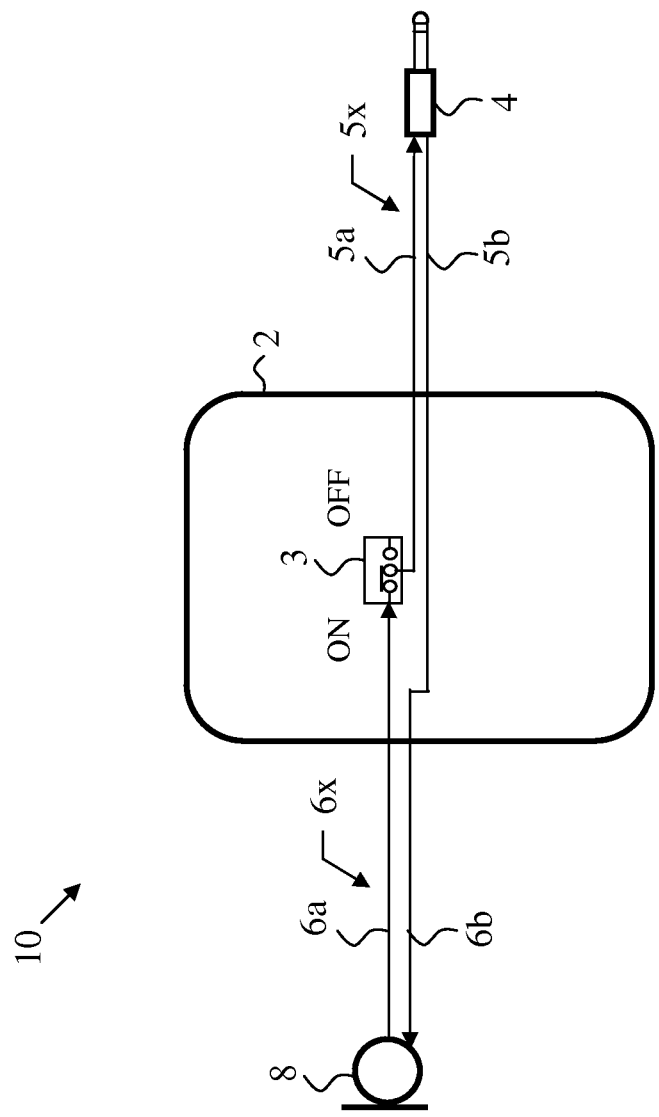
FIG. 2 illustrates a block-diagram of the typical prior-art computer desktop microphone peripheral similar to the device illustrated in FIG. 1 having analog audio interface with the computer.

FIG. 2 illustrates a block diagram presenting of a prior art computer desktop microphone device 10 similar to the device of FIG. 1 above having an analog audio interface cable having leads 5a and 5b coupled to the computer through 3.5 mm audio plug 4. Electrets microphone capsule 8 installed on a flexible goose neck boom, which is a hollow tube (not seen in this figure) used to route microphone cable 6x having audio output line 6a, microphone bias line 6b (optional) and ground or shield wire (not shown in this figure and in the next figures). Microphone audio output line 6a is coupled to a single pole switch 3 to enable user On-Off control of the microphone activity. Switched audio output is routed through on-off switch 3 through the computer interface cable 5x to the coupled computer where analog audio signal is converted using Audio CODEC into a digital stream. Line 5a passes the microphone audio output into the computer while microphone bias line 5b passes low voltage bias to drive the microphone capsule internal FET (Field Effect Transistor) preamplifier. This line is optional as in many applications microphone bias is derived by the computer audio CODEC circuitry together with the microphone audio input line.

This prior-art computer desktop microphone device is having same security vulnerabilities and disadvantages as described in FIG. 1 above. In addition, the longer analog signal path in this device tends to reduce the signal quality through distortion and higher electrical noise levels.

Figure 3:
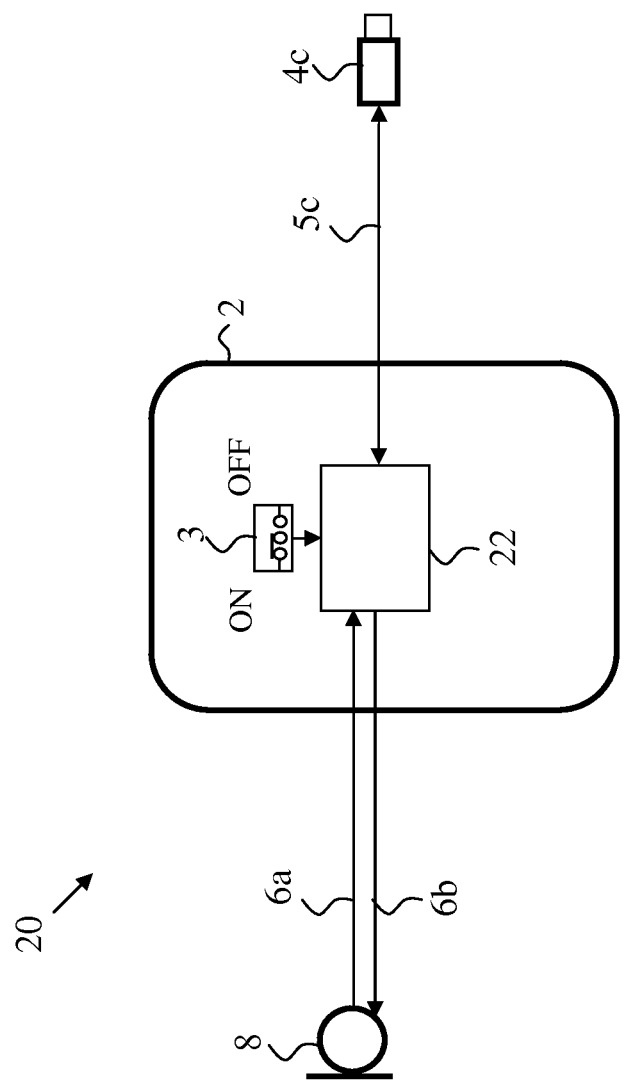
FIG. 3 illustrates yet another high-level block-diagram of a prior art computer desktop microphone peripheral similar to the device illustrated in FIG. 1 having internal USB audio CODEC and USB interface with the computer.

FIG. 3 illustrates a block diagram presentation of another prior-art computer desktop microphone device implementation 20 similar to the devices of FIGS. 1 and 2 above having a USB (Universal Serial Bus) computer interface cable 5c coupled to the computer through USB Type-A plug 4c. Electrets microphone capsule 8 installed on a flexible goose neck boom which is a hollow tube used to route microphone cable 6x having audio output line 6a, microphone bias line 6b (optional) and ground or shield wire (not shown in this figure and in the next figures). Microphone lines 6a and 6b are coupled to the USB Audio CODEC chip 22 where Analog to Digital conversion is made. A single pole switch 3 to enable user On-Off control of the microphone activity typically through the switching of USB CODEC line called MIC_MUTE. Once this line is asserted the USB CODEC mutes the microphone output to the coupled computer.

Typical example for USB Audio CODEC is PCM2906B-Texas Instruments' single-chip stereo audio CODEC with USB interface. Many silicon vendors are offering similar solutions with different functions and audio quality levels. Newer USB Audio CODEC chips offer active noise-canceling and internal audio enhancements While this computer desktop microphone offers better sound quality, it lacks some critical security functions as mentioned above and therefore it is regarded as unsecure device.

Figure 4:
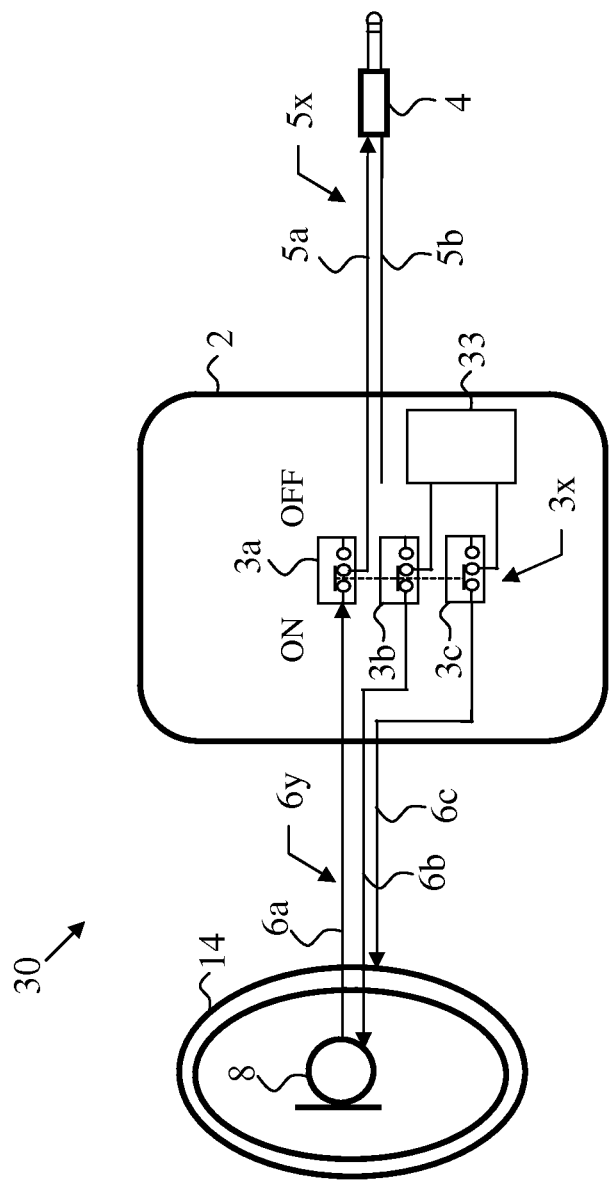
FIG. 4 illustrates a high-level block-diagram of an exemplary method and embodiment of the present invention having user indications and microphone input switched by a 3-Pole synchronized mechanical switch and analog audio interface with the computer.

FIG. 4 illustrates a high-level block diagram of a secure computer desktop microphone 30 according to an exemplary embodiment of the current invention.

Secure computer desktop microphone 30 is having an analog audio interface with the coupled computer via cable 5x having leads 5a and 5b and connector 4. In this embodiment of the current invention, microphone capsule 8 is coupled to a visual indicator element 14. In an exemplary embodiment, visual indicator element 14 is illuminated. In some embodiments, visual indicator element 14 is an illuminated ring. For example, this ring may optionally comprise one or several light sources such as blue color LEDs that provides clear visual indication when microphone 8 is active. In some embodiments the light source is blinking to enhance the awareness of the user to the fact that the microphone is active. However, other indication methods may ne used, for example a lamp or light source other than an LED, a vibrator or solenoid-activated semaphore. Power line 6c to the visual indicator element 14 is passed together with the microphone audio output 6a and the microphone bias line 6c through the microphone boom goose-neck through cable 6y that coupled to the 3-Pole switch 3x. The 3-Pole switch 3x is made of three mechanically coupled switches 3a, 3b and 3c typically implemented as one slider switch located in a location accessible to the user such as in the device base 2 or near the microphone capsule 8. Switch 3*a* switches the microphone analog audio output signal that connected through line 5*a* and microphone connector 4 to the coupled computer.

Switch 3*b* switches the microphone bias line 6*b* to the power supply 33 located at the device base 2. Power supply 33 may be a wall-mounted power supply or one or more batteries. Same power supply 33 is used to drive the lighted ring element 14 through switch 3*c* and line 6*c*. Microphone bias line 5*b* from connected computer is not connected in the device to assure that microphone capsule 8 cannot be active while power supply 33 is off or failed. If microphone capsule 8 does not require bias voltage for normal operation, additional electronic circuit may be added inside the device base 2 to assure that when power supply 33 is not capable of powering the lighted ring element 14, microphone audio output will be disconnected from coupled computer.

During normal device operation user will move the 3-Pole switch 3*x* to the left position when using the device. This will not only activate the microphone 8 by switching its bias and audio lines (6*b* and 6*a* respectively) but also will provide clear visual indications to the user through the lighted ring element 14 that is coupled to the microphone 8. Once the user finished using the device, he/she will move the 3-Pole switch 3*x* to the right position. At this position the microphone audio output is isolated from the coupled computer through switch 3*a*, microphone bias voltage is isolated from its power source 33 through switch 3*b* and lighted ring element 14 is disconnected from its power source 33 by switch 3*c*.

It should be noted that the mechanical switch 3*x* can be replaced by an equivalent electronic switching circuitry that can add more security functions such as time delay switching and active anti-tampering (these features are described in details in the next figures).

This relatively simple and low-cost exemplary embodiment of the current invention provides good isolation of the microphone capsule from the computer when device is unused together with clear user indication when in active use. Therefore this device provides additional security level and privacy for computer users that require audio communication capabilities.

Figure 5:
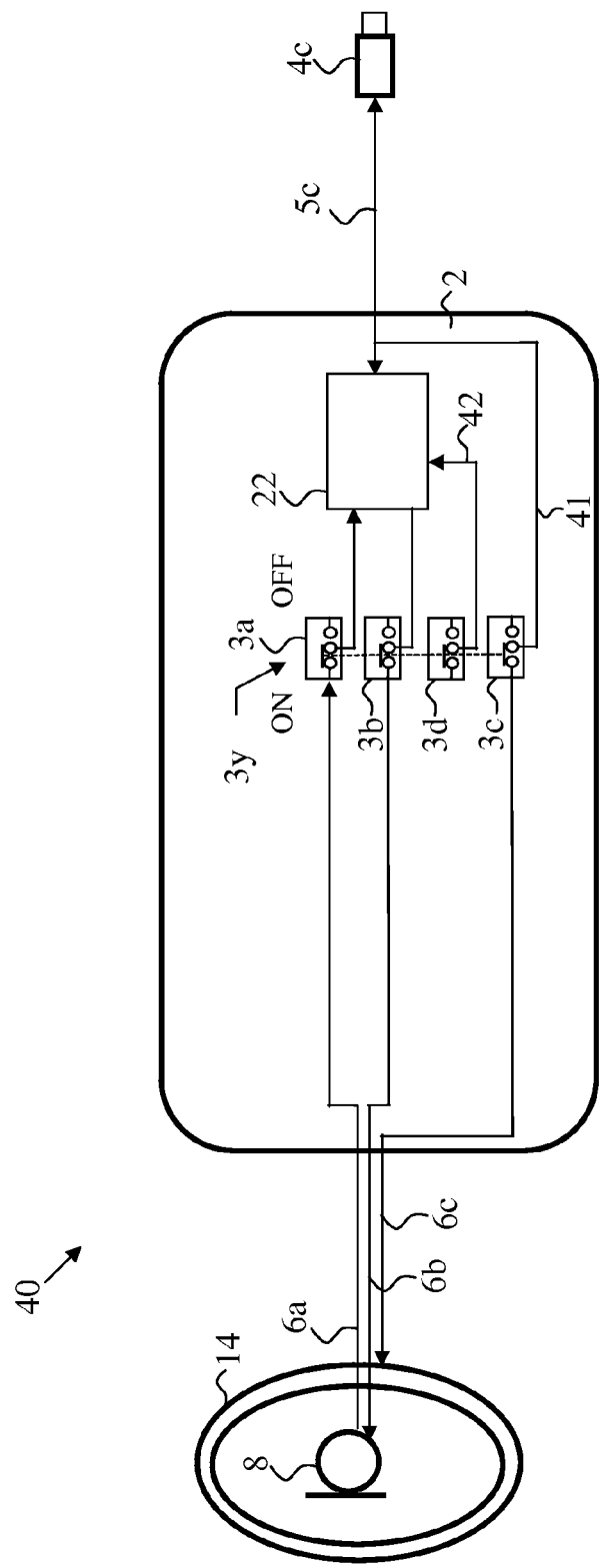
FIG. 5 illustrates a high-level block-diagram of yet another exemplary method and embodiment of the present invention having a 4-Pole synchronized mechanical switch, a USB CODEC chip and USB interface with the computer.

FIG. 5 illustrates a high-level block diagram of another secure computer desktop microphone 40 according to an exemplary embodiment of the current invention. Secure computer desktop microphone 40 is having a USB interface cable 5*c* with the coupled computer. This embodiment of the current invention is similar to the embodiment described in FIG. 4 above but is having a USB Audio CODEC chip 22, USB cable 5*c* and USB plug 4*c* instead of analog interface. This interface not only capable of improving the audio quality but also provides local power to the device through the USB +5V supply line 41. This USB power is switched through switch 3*c*, which is part of the 4-Pole switch 3*y*, to provide switched power to the lighted ring element 14. The use of USB interface provides a reliable power source to drive both the USB CODEC 22 and the lighted ring element 14 without the risk of having active microphone together with unpowered lighted ring element 14.

In this embodiment there is another switch part 3*d* that is used to switch the USB Audio CODEC MIC_MUTE input line 42. Once the user switches off the microphone by moving switch 3*y* to the Off position, this input is asserted to signal the USB Audio CODEC 22 to mute the microphone input. This input can be detected by the software driver installed on the coupled computer in order to provide user or application awareness to the microphone mute state.

This preferred embodiment of the current invention provides higher level of security through the added function of the microphone mute and through the use of reliable USB power source. It may be useful to use the microphone mute function of the USB CODEC chip since if one disconnects the microphone (e.g. using switch 3*a*), and the USB CODEC chip is not aware of that fact, the computer, OS and applications unaware that the microphone is muted. It may be preferred that the driver will become aware of the microphone status, so the user may be notified, for example by an "on screen massage, that his audio input is needed but unavailable. Since mute switch 3*d* is physically shutting down the A/D inside the CODEC it provides an optional additional layer of protection to prevent microphone activation. It should be noted that in some embodiments, microphone output line 6*a* may be disconnected from USB CODEC 22 by switch 3*a*. Thus, in some embodiments, one of switches 3*a* and 3*d* may be missing. Additionally, some microphones may not need bias, making switch 3*c* and line 6*c* redundant or missing.

Figure 6:
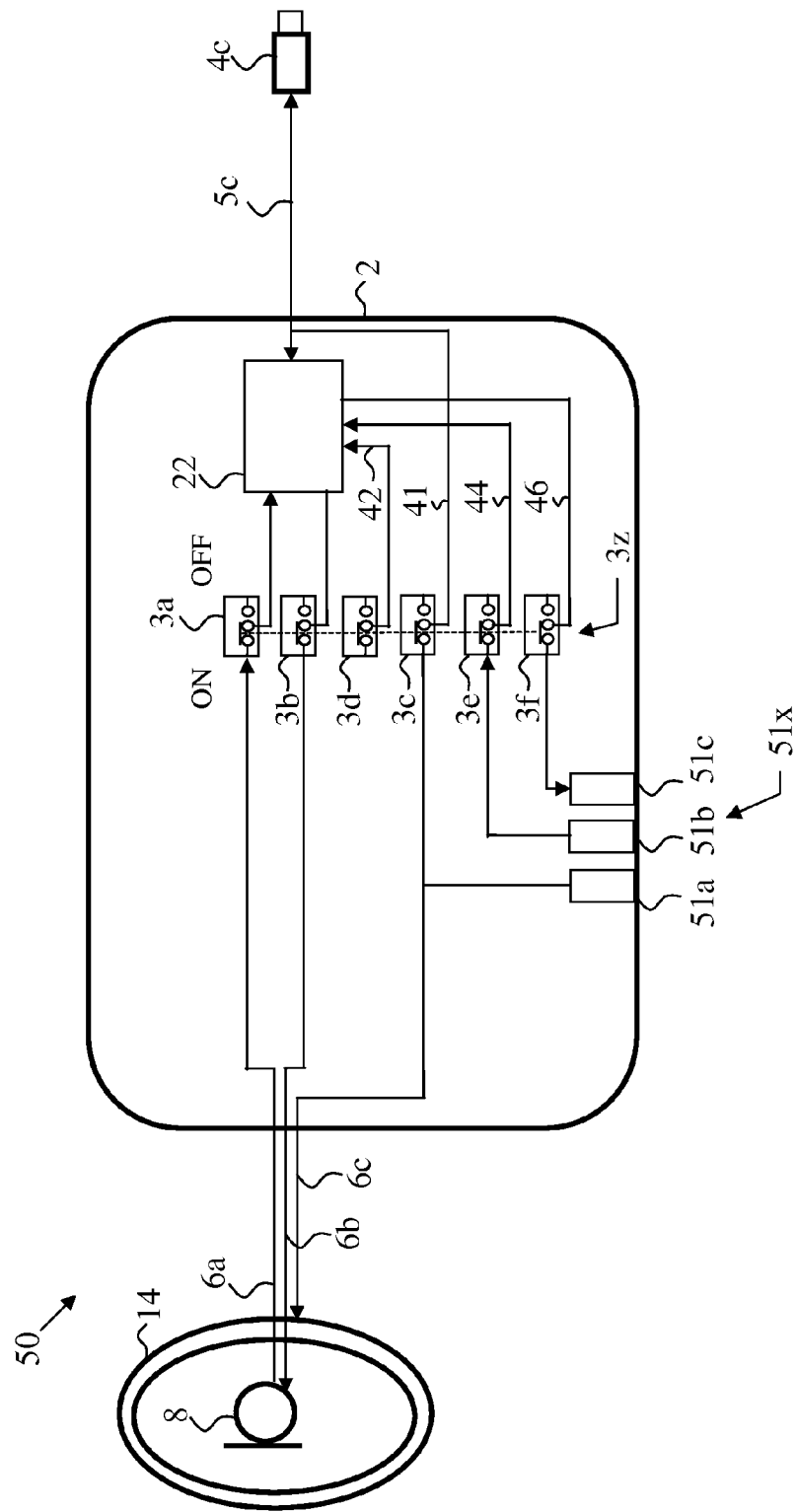
FIG. 6 illustrates a high-level block-diagram of another exemplary method and device similar to FIG. 5 above having a 6-Pole synchronized mechanical switch to enable audio and power switching to additional auxiliary secure headset according to the current invention.

FIG. 6 illustrates a high-level block diagram of another secure computer desktop microphone 50 according to an exemplary embodiment of the current invention having a USB interface cable 5*c* with the coupled computer.

This embodiment of the present invention is similar to the embodiment described in FIG. 5 above with the additional connectors 51*x* to support optional external audio devices such as secure headset.

In this embodiment of the current invention, the On-Off switch 3*z* is 6-Pole type. Switch 3*c* controls the power to the lighted ring element 14 together with the power supplied to the external device lighted element through connector 51*a*.

Switch 3*e* switches the USB Audio CODEC 22 external microphone input line 44 from input jack 51 b to enable secure connection of an external microphone (not seen in this figure).

Switch 3*f* switches the USB Audio CODEC 22 external headphones output lines 46 and output jack 51*c* to enable secure connection of and external headset transducers such as earphones or speakers. It should be noted here that in some cases it is possible to abuse audio speakers as microphones and therefore it is sometimes required that audio output lines will be disabled just like microphone lines to prevent audio eavesdropping.

USB Audio CODEC 22 may select internal or external audio source through appropriate coupled computer installed software driver settings.

Figure 7:
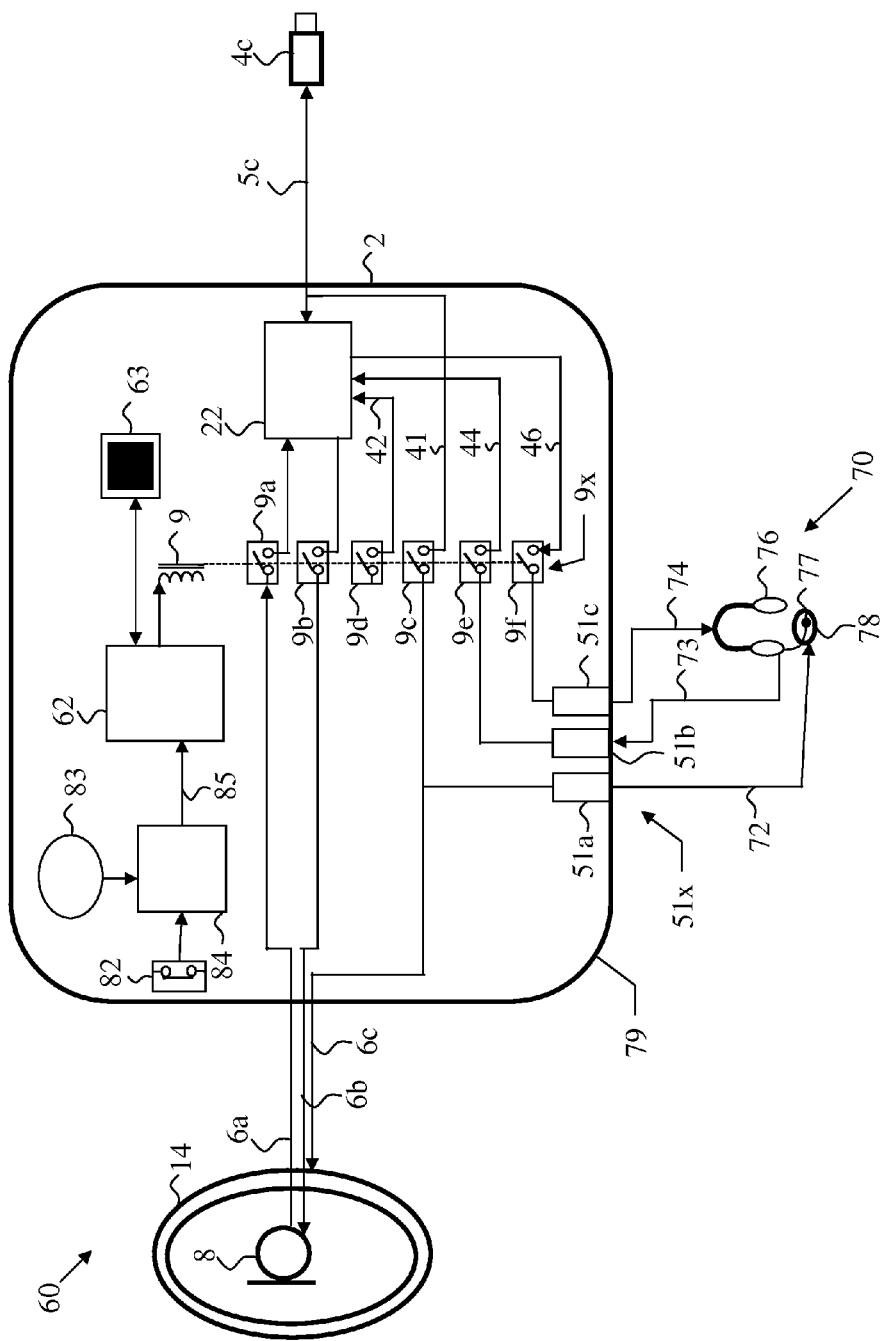
FIG. 7 illustrates a high-level block-diagram of yet another exemplary method and device similar to FIG. 6 above having a microcontroller function that controls a 6-Pole synchronized relay or solid-state switch and additionally illustrates an exemplary secure headset according to the current invention.

FIG. 7 illustrates a high-level block diagram of yet another secure computer desktop audio peripheral device 60 according to yet another exemplary embodiment of the current invention having a USB interface cable 5*c* with the coupled computer.

This embodiment of the present invention is similar to the embodiment described in FIGS. 5 and 6 above but in this embodiment the On-Off switch is implementation is a relay or electronic switching circuitry 9*x* that is controlled by a microcontroller 62. In this embodiment of the current invention the user switches the device microphone and optionally speakers or headset through an optionally illuminated momentary push-button 63. Once the user wants to enable the device he/she momentarily presses the push-button 63. Push-button 63 signals the microcontroller 62 that turns on the switch 63 internal illumination and at the same time switches relay or solid-state switches 9*x* on through coil 9 or a similar device. Relay 9*x* then closes the circuits of the following lines simultaneously:

1. Switch 9a connecting microphone capsule 8 audio output to the USB Audio CODEC 22 microphone input;
2. Switch 9b connecting optional microphone capsule 8 bias input to the USB Audio CODEC 22 microphone bias output;
3. Switch 9c connecting the lighted ring element 14 to the USB supply power line 41.
   Same switch 9c also driving secure headset lighted ring element 78 via jack 51a and line 72;
4. Switch 9d connecting the USB Audio CODEC 22 MIC_MUTE input with the ground or the power plane to disable the microphone mute function;
5. Switch 9e connecting the USB Audio CODEC auxiliary microphone input 44 with the microphone capsule 77 in secure headset 70 via jack 51b and line 73; and
6. Switch 9f connecting the USB Audio CODEC auxiliary headset audio output 46 with the secure headset 70 audio transducers 76 via jack 51 c and lines 74 (typically two lines to support stereophonic audio);

Once the microcontroller 62 switches relay 9x on it holds it in the on state for pre-programmed time interval (for example 2 minutes) and then it releases the relay 9x to disable the device. The user than may reactivate the device for another time interval as required to complete its device usage using push-button 63 again and again.

Microcontroller 62 may be programmed to perform other switching functions such as: VOice ACtivated switching (VOX) that holds the relay 9x if voice level exceeds a certain level or other programmed functions as required for particular use. For example VOX function may hold the microphone enabled after switch 63 was presses for as long as the user is talking, and disables the microphone if the user is not talking for a preset (dwell) time. Optionally a directional microphone is used so that ambient noise is less effective on the VOX function. Optionally VOX function has a preset maximum activation duration.

In an embodiment of the present invention the secure computer audio peripheral device is optionally further equipped with active anti-tampering function 84. This function uses low power microcontroller or discrete components to sense mechanical intrusion attempt through sensor such as switch 82. When switch 82 is interrupted, the anti-tampering function 84 senses this transition and triggers a chain of events through line 85 that cause the following effects:
a. Device is disabled permanently—it cannot be activated anymore.
b. Device provides clear user indications of the tampered state. These indication typically include blinking action of the lighted ring elements 14 and 78 and push-button switch 63.

During normal operation, microcontroller 62 and anti-tampering function 84 are powered by coupled computer through the USB interface supply 41. For drawing clarity these power lines were omitted from the drawings.

Coin battery or super-capacitor 83 provides backup power for the anti-tampering function 84 and sensor 82 to enable detection even when the device is unpowered (for example during shipment). Addition means such as tamper evident labels may be used to provide visual indications of the tampering attempt.

It should be noted that the active anti-tampering function may be critical to assure that product was not tampered with modified or extra circuitry to provide a covert audio channel with remote attacker.

Secure headset 70 of the current invention is a modified computer headset adapted to interface with the device of the current invention through the following:

1. Lighted ring element 78 that installed near the microphone boom end.
2. Modified connectors to provide the additional lines required to support the Lighted ring element 78 and to prevent the usage of non-secure headsets.

It should be noted that jacks 51x may be replaced by a single connector having sufficient number of connector's contacts, such as 6 or more contacts. Jacks 51x may be replaced by and uncommon or proprietary connector such that it cannot be used with a common headset, or a combination of common microphone and earphones/speaker, thus reducing the possibility of abusing the system.

In some optional embodiments, common audio inputs and optionally outputs are disabled, physically removed, plugged, jammed or missing such that no common microphones, earphones, headsets or speakers may be used with the computer.

Additionally, or optionally, the devices 40, 50 and/or 60 may comprise an authentication or verification function known in the art. Such authentication or verification function may be in the form that allows the computer to interrogate the USB functions in the devices 40, 50 and/or 60 and verify that the connected device is a "trusted device". In some embodiments, tempering with the device may optionally disable its authentication or verification function.

In some embodiments, a momentary switch is used for activation of the microphone in a Push-To-Talk (PTT) fashion such that the microphone is enabled only as long as the switch is pressed. In these embodiments, the visual indicator optionally provides assurance that the momentary switch is mot jammed in pressed position, and a visual indication to other people in the room that a microphone is active.

In other optional embodiments, a timer (for example, but not limited to a timer implemented within controller 62 of FIG. 7) may sense the length of time that momentary switch 63 is pressed. If momentary switch 63 is pressed for a long duration, it may indicate a jamming of the switch, or a mechanical force forcing the switch. In such case, corrective action may be taken automatically, such as immediate transition to a secured (mute) state, and/or temporarily or permanently disabling of the device.

In some optional embodiments, the computer may keep a log of the times that the microphone was active and this log may be manually or automatically scanned for signs of potential abuse such as frequent or long durations of audio activity.

In some optional embodiments the microphone activation duration in response to each pressing of the momentary switch may be programmed. Programming may be done at manufacturing for example by programming firmware within the tempered-proof enclosure 79 of device 60. Alternatively, DIP Switches or jumpers within the tempered-proof enclosure 79 of device 60 may be used.

Alternatively, optionally or additionally, a dial, DIP switches or other switch located on the outside of the device may be used for adjusting the microphone activation duration in response to each pressing of the momentary switch. In this case, the time duration is preferably adjusted with a limited range such as 5 sec to 5 minutes.

In some optional embodiments time durations of VOX dwell time and maximum time are factory and/or field adjustable as disclosed above.

In some optional embodiments the mode of operation: toggle; PTT and/or VOX may be factory and/or field adjustable as disclosed above.

In some optional embodiments, light intensity of indicator light 14 or 78 is controlled to match the requirements of being visibly noticeable, but not overly illuminating when operated in a dark room or at night. Illumination level may be controlled by the user using a dimmer, or automatically by ambient light sensor.

In some optional embodiments, devices 50 or 60 are designed to be used only with headset 70 such that microphone capsule 8, indicator 14 and their connecting lines, are missing. Optionally, connector 51x is also missing and headset 70 is permanently connected to the device. Optionally, in these embodiments the entire device 50 or 60 is integrated within the headset.

Figure 8:
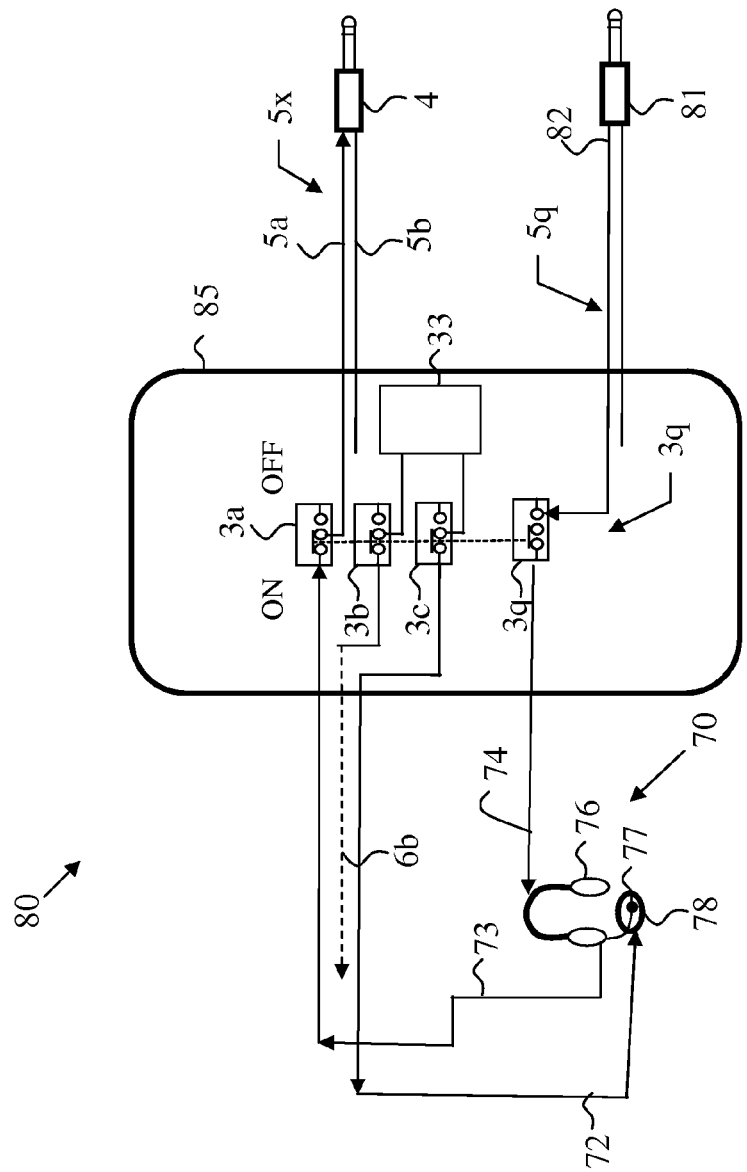
FIG. 8 illustrates a high-level block-diagram of an exemplary method and embodiment of the present invention having user indications and a headset input/output switched by a 4-Pole synchronized mechanical switch and analog audio interface with the computer.

FIG. 8 illustrates a high-level block-diagram of an exemplary method and embodiment of the present invention having user indications and a headset input/output switched by a 4-Pole synchronized mechanical switch and analog audio interface with the computer.

Secure headset 80 is similar to secure computer desktop microphone 30 of FIG. 4 with the following differences:

a) Microphone boom goose-neck cable 6y, microphone capsule 8, indicator 14 and their connecting lines, are missing. Instead microphone 77 and lighted element 78 of headset 70 are used.

b) An analog audio input cable 5q interfaces with the analog output port of the computer via analog connecter 81. Analog output line (82, 74) leading to earphones 76, is switched on and off simultaneously with the microphone lines (73, 5a) and indicator line 72 via switch 3q which is part of switch 3q. Optional microphone bias line 6b is seen here unconnected, but may be connected to bias microphone 77 if needed.

Headset 70 may be connected to body 85 of device 80 via a connector similar to connector 51x of FIGS. 6 and 7 (not seen in this figure). Alternatively headset 70 is permanently connected to the device 80. Optionally, in these embodiments the entire device 80 is integrated within the headset.

In some optional embodiments the microphone bias voltage is used for powering the indicator, and the microphone is of a design that cannot operate or produce signal in the absence of the bias voltage.

In some embodiments the visual indicator is a dual-color indicator, for example a red/green LED. Red light may indicate active microphone while green red light may indicate that the device is in a secured state. In some embodiments, the visual indicator is capable of indication that the device was tempered with, for example by having no light at the visual indicator.

As used herein, the term "computer" or "module" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer".

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects.

Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A secure computer audio peripheral device comprising:
   a microphone;
   at least one lighted indicator capable of providing visual user indication when said microphone is active;
   a computer interface, cable connecting the secure computer audio peripheral device to a coupled computer; and;
   a switch capable of setting the secure computer audio peripheral device in a secure state by simultaneously:
   disabling said microphone; and
   turning off said lighted indicator; and
   said switch is capable of setting the secure computer audio peripheral device in an operational state by simultaneously:
   enabling transfer of audio data from said microphone to said coupled computer; and
   turning on said lighted indicator,
   wherein said switch is activated by a user through a momentary push-button, and
   wherein said switch is controlled by a first timer determining a time delay of a predefined time duration, said first timer is activated by said momentary push-button to set the secure computer audio peripheral device in said operational state, and said switch automatically sets the secure computer audio peripheral device in said secure state after expiration of the time delay to prevent inadvertent prolonged microphone activation, and further comprising a second timer, said second timer operative to prevent inadvertent prolonged microphone activation when said momentary push-button undesirably stays pressed for a prolonged time duration by causing the secure computer audio peripheral device to be switched to said secure state.

2. The secure computer audio peripheral device of claim 1, wherein:
said coupled computer comprises a USB port;
said computer interface cable is USB type cable connected to said USB port;
said device is further comprising of a USB CODEC to interface between said switch and said coupled computer; and
wherein power to said device is supplied from said coupled computer through said USB port.

3. The secure computer audio peripheral device of claim 2, wherein said switch is further coupled to the said USB CODEC mute input, to mute said microphone input when said device is in a secure state.

4. The secure computer audio peripheral device of claim 1, wherein illumination intensity of said lighted indicator is controlled by the user within a range of illumination levels.

5. The secure computer audio peripheral device of claim 1, wherein illumination intensity of said lighted indicator is automatically controlled by the ambient light sensor within a range of illumination levels.

6. The secure computer audio peripheral device of claim 1, wherein said disabling said microphone comprises electrically disconnecting said microphone from said computer interface cable.

7. The secure computer audio peripheral device of claim 1, further comprising at least one tamper evident label to provide visual indications of a tampering attempt.

8. The secure computer audio peripheral device of claim 1, wherein said time delay is adjustable by the user.

9. The secure computer audio peripheral device of claim 1, wherein said push-button comprises an internal lighted element providing user indication when microphone is active.

10. The secure computer audio peripheral device of claim 1, and comprising at least one audio output transducer selected from a group consisting of: a speaker; and an earphone, wherein said audio output transducer is active when the secure computer audio peripheral device is in said operational state and disabled when said device is in said secure state.

11. The secure computer audio peripheral device of claim 10, wherein said at least one audio output transducer is an earphone, and wherein said microphone and said earphone are integrated in a headset.

12. The secure computer audio peripheral device of claim 11, wherein said headset is connected to said device via a connector.

13. The secure computer audio peripheral device of claim 11, wherein the secure computer audio peripheral device is integrated into said headset.

14. The secure computer audio peripheral device of claim 11, wherein said switch is located in a box located on a cable leading from said coupled computer to said headset.

15. A secure computer audio peripheral device comprising:
a microphone;
at least one lighted indicator capable of providing visual user indication when said microphone is active;
a computer interface, cable connecting the secure computer audio peripheral device to a coupled computer; and;
a switch capable of setting the secure computer audio peripheral device in a secure state by simultaneously:
disabling said microphone; and
turning off said lighted indicator; and
said switch is capable of setting the secure computer audio peripheral device in an operational state by simultaneously:
enabling transfer of audio data from said microphone to said coupled computer; and
turning on said lighted indicator,
wherein said switch is activated by a user through a momentary push-button,
wherein said switch is controlled by a first timer determining a time delay of a predefined time duration, said first timer is activated by said momentary push-button to set the secure computer audio peripheral device in said operational state, and said switch automatically sets the secure computer audio peripheral device in said secure state after expiration of the time delay to prevent inadvertent prolonged microphone activation, and
wherein said switch is further controlled by a second timer, said second timer operative to prevent inadvertent prolonged microphone activation when said momentary push-button undesirably stays pressed for a prolonged time duration by causing the secure computer audio peripheral device to be switched to said secure state, and
wherein said switch is further controlled by a Voice Activated switching (VOX) function, activated by the user to set the secure computer audio peripheral device in said operational state, and automatically sets the secure computer audio peripheral device in said secure state after predefined time duration in which sound level detected by said microphone is below a threshold.

16. A secure computer audio peripheral device comprising:
a microphone;
at least one lighted indicator capable of providing visual user indication when said microphone is active;
a computer interface,
cable connecting the secure computer audio peripheral device to a coupled computer; and
a switch, controllable by a user, and capable of setting the secure computer audio peripheral device in a secure state by simultaneously:
disabling said microphone; and
turning off said lighted indicator; and
said switch is capable of setting the secure computer audio peripheral device in an operational state by simultaneously:
enabling transfer of audio data from said microphone to said coupled computer; and
turning on said lighted indicator;
a mode selector, used by a user to select an operation mode of said device,
wherein the secure computer audio peripheral device may operate in the modes consisting of:
Push-To-Talk (PTT) mode, wherein said switch is activated by a momentary push-button operable as push-to-talk switch activated by the user to set the secure computer audio peripheral device in said operational state while said push-button is pressed, and automatically set the secure computer audio peripheral device in said secure state when said push-button is released;
Timer mode, wherein said switch is controlled by a time delay, activated by the user to set the secure computer audio peripheral device in said operational state, and automatically set the secure computer audio peripheral device in said secure state after predefined time duration to prevent inadvertent prolonged microphone activation; and Voice Activated switching (VOX) mode wherein said switch is controlled by a VOX function, activated by the user to set the secure computer audio peripheral device in said operational state, and automatically set the secure computer audio peripheral device in said secure state after predefined time duration in which sound level detected by said microphone is below a threshold.

17. The secure computer audio peripheral device of claim 16, wherein said VOice ACtivated switching (VOX) function has a preset maximum activation duration.

18. A secure computer audio peripheral device comprising:
a microphone;
at least one lighted indicator capable of providing visual user indication when said microphone is active;
a computer interface, cable connecting the secure computer audio peripheral device to a coupled computer; and;
a switch capable of setting the secure computer audio peripheral device in a secure state by simultaneously:
disabling said microphone; and
turning off said lighted indicator; and
said switch is capable of setting the secure computer audio peripheral device in an operational state by simultaneously:
enabling transfer of audio data from said microphone to said coupled computer; and
turning on said lighted indicator,
wherein said switch is activated by a user through a momentary push-button, and
wherein said switch is controlled by a first timer determining a time delay of a predefined time duration, said first timer is activated by said momentary push-button to set the secure computer audio peripheral device in said operational state, and said switch automatically sets the secure computer audio peripheral device in said secure state after expiration of the time delay to prevent inadvertent prolonged microphone activation, and
wherein said switch is further controlled by a second timer, said second timer operative to prevent inadvertent prolonged microphone activation when said momentary push-button undesirably stays pressed for a prolonged time duration by causing the secure computer audio peripheral device to be switched to said secure state, and said device further comprising an anti-tampering circuitry capable of detecting mechanical intrusion attempt, and to disable said device once such attempt is detected.

19. The secure computer audio peripheral device of claim 18, further comprising a power source for powering said active anti-tampering circuitry when the device is unpowered, wherein said power source is selected from a group consisting of: battery; and super-capacitor.

20. The secure computer audio peripheral device of claim 18, wherein said anti-tampering circuitry is configured to permanently disable the device when the mechanical intrusion attempt is detected.

21. A method for securing a computer audio peripheral device comprising:
coupling to a computer, a secure computer audio peripheral device comprising:
a microphone; and
at least one visual indicator to provide visual user indication when said microphone is active;
pressing a momentary push-button for setting the secure computer audio peripheral device in an operational state by simultaneously:
enabling transfer of audio data from said microphone to said coupled computer; and
turning on said visual indicator;
if desired, pressing the momentary push-button for setting the secure computer audio peripheral device in a secure state by simultaneously:
disabling said microphone; and
turning off said lighted indicator; and
after a preset time as determined by a first timer, automatically setting the secure computer audio peripheral device in a secure state to prevent inadvertent prolonged microphone activation by simultaneously:
disabling said microphone; and
turning off said visual indicator; and
setting a second timer, detecting when said momentary push-button undesirably stays pressed for a prolonged time duration, and causing the secure computer audio peripheral device to be switched to said secure state to prevent inadvertent prolonged microphone activation in response to expiration of the prolonged time duration.

22. The method of claim 21, wherein:
said visual indicator is a lighted indicator; and
said turning on said visual indicator comprises causing said visual indicator to emit visible light.

* * * * *